United States Patent
Albesano et al.

(10) Patent No.: US 7,827,031 B2
(45) Date of Patent: Nov. 2, 2010

(54) METHOD FOR ACCELERATING THE EXECUTION OF SPEECH RECOGNITION NEURAL NETWORKS AND THE RELATED SPEECH RECOGNITION DEVICE

(75) Inventors: Dario Albesano, Turin (IT); Roberto Gemello, Turin (IT)

(73) Assignee: Loquendo S.p.A., Turin (IT)

(*) Notice: Subject to any disclaimer, the term of this patent is extended or adjusted under 35 U.S.C. 154(b) by 1151 days.

(21) Appl. No.: 10/504,491

(22) PCT Filed: Feb. 12, 2003

(86) PCT No.: PCT/EP03/01361
§ 371 (c)(1),
(2), (4) Date: Aug. 10, 2004

(87) PCT Pub. No.: WO03/073416
PCT Pub. Date: Sep. 4, 2003

(65) Prior Publication Data
US 2005/0171766 A1    Aug. 4, 2005

(30) Foreign Application Priority Data
Feb. 28, 2002  (IT) .......................... T02002A0170

(51) Int. Cl.
G10L 15/16   (2006.01)
G10L 11/00   (2006.01)
G10L 15/00   (2006.01)
G10L 15/28   (2006.01)
G10L 15/14   (2006.01)
G05B 13/02   (2006.01)
G06E 1/00    (2006.01)

(52) U.S. Cl. ........................ 704/232; 704/202; 704/231; 704/251; 704/252; 704/255; 704/256; 700/48; 706/15

(58) Field of Classification Search ................. 704/202, 704/232, 256, 231, 251, 252, 254, 255; 706/15–44; 382/159–161; 700/48
See application file for complete search history.

(56) References Cited

U.S. PATENT DOCUMENTS
5,461,696 A * 10/1995 Frank et al. ................. 704/232

(Continued)

FOREIGN PATENT DOCUMENTS
EP   0 623 914    11/1994
EP   0 733 982     9/1996

OTHER PUBLICATIONS

Albesano, D., Gemello, R., Mana, F., 1997. Hybrid HMM-NN modeling of stationary-transitional units for continuous speech recognition. In: Proc. Neural Information Processing, pp. 1112-1115.*

(Continued)

*Primary Examiner*—David R Hudspeth
*Assistant Examiner*—Paras Shah
(74) *Attorney, Agent, or Firm*—Banner & Witcoff, Ltd.

(57) ABSTRACT

A neural network in a speech-recognition system has computing units organized in levels including at least one hidden level and one output level. The computing units of the hidden level are connected to the computing units of the output level via weighted connections, and the computing units of the output level correspond to acoustic-phonetic units of the general vocabulary. This network executes the following steps:

determining a subset of acoustic-phonetic units necessary for recognizing all the words contained in the general vocabulary subset;

eliminating from the neural network all the weighted connections afferent to computing units of the output level that correspond to acoustic-phonetic units not contained in the previously determined subset of acoustic-phonetic units, thus obtaining a compacted neural network optimized for recognition of the words contained in the general vocabulary subset; and executing, at each moment in time, only the compacted neural network.

6 Claims, 2 Drawing Sheets

U.S. PATENT DOCUMENTS

| | | | | |
|---|---|---|---|---|
| 5,621,859 A | * | 4/1997 | Schwartz et al. | 704/256 |
| 5,638,487 A | * | 6/1997 | Chigier | 704/253 |
| 5,745,649 A | * | 4/1998 | Lubensky | 704/232 |
| 5,822,742 A | * | 10/1998 | Alkon et al. | 706/31 |
| 5,867,816 A | * | 2/1999 | Nussbaum | 704/232 |
| 5,960,391 A | * | 9/1999 | Tateishi et al. | 704/232 |
| 6,151,592 A | * | 11/2000 | Inazumi | 706/16 |
| 6,208,963 B1 | * | 3/2001 | Martinez et al. | 704/232 |
| 6,240,389 B1 | * | 5/2001 | Keiller et al. | 704/243 |
| 6,665,639 B2 | * | 12/2003 | Mozer et al. | 704/244 |
| 6,832,191 B1 | * | 12/2004 | Frasca et al. | 704/257 |

OTHER PUBLICATIONS

Sietsma, J., Dow, R.J.F., 1988. Neural net pruning—why and how. In IEEE International Conference on Neural Networks 1 (San Diego, 1988). IEEE, New York, pp. 325-333.*

Abdallah, Moatassem M. et al. "A modular neural network approach to the speech recognition problem" in: ANNIE '99, pp. 1079-1083.*

Albesano, D., Baggia, P., Danieli, M., Gemello, R., Gerbino, E., and Rullent, C. (1997). A robust sys-tem for human-machine dialogue in a telephony-based application. Journal of Speech Technology,2(2), 99-110.*

Pruning Algorithms—A Survey by Russel Reed (IEEE Sep. 1993).

A Whole Wordrecurrent Neural Network . . . by Naylor et al. (IEEE Sep. 1992).

* cited by examiner

METHOD FOR ACCELERATING THE EXECUTION OF SPEECH RECOGNITION NEURAL NETWORKS AND THE RELATED SPEECH RECOGNITION DEVICE

RELATED APPLICATIONS

This application is a national stage entry under 35 U.S.C. 371 of PCT/EP03/01361, filed on Feb. 12, 2003, which claims priority to Italian patent application no. TO2002A000170, filed on Feb. 28, 2002.

TECHNICAL FIELD

This invention refers to automatic signal recognition systems, and specifically regards a method for accelerating neural network execution and a speech recognition device using that method.

BACKGROUND ART

An automatic speech recognition process can be schematically described as a number of modules placed in series between a speech signal as input and a sequence of recognised words as output:
- a first signal processing module, which acquires the input speech signal, transforming it from analogue to digital and suitably sampling it;
- a second feature extraction module, which computes a set of parameters that well describe the features of the speech signal in terms of its recognition. This module uses, for example, spectral analysis (DFT) followed by grouping in Mel bands and a discrete transformed cosine (Mel based Cepstral Coefficients);
- a third module that uses temporal alignment algorithms and acoustic pattern matching; for example a Viterbi algorithm is used for temporal alignment, that is to say it manages the time distortion introduced by the different rates of speech, while for pattern matching it is possible to use prototype distances, the likelihood of Markovian states or a posteriori probability generated by neural networks;
- a fourth linguistic analysis module for extracting the best word sequence (present only for recognition of continual speech); for example, it is possible to use models with bigrams or trigrams of words or regular grammar.

In the above model the neural networks enter into the third module as regards the acoustic pattern matching aspect, and are used for estimating the probability that a portion of speech signal belongs to a phonetic class in a set given a priori, or constitutes a whole word in a set of prefixed words.

Neural networks have an architecture that has certain similarities to the structure of the cerebral cortex, hence the name neural. A neural network is made up of many simple parallel computation units, called neurones, densely connected by a network of weighted connections, called synapses, that constitute a distributed computation model. Individual unit activity is simple, summing the weighted input from the interconnections transformed by a non-linear function, and the power of the model lies in the configuration of the connections, in particular their topology and intensity.

Starting from the input units, which are provided with data on the problem to solve, the computation propagates in parallel in the network up to the output units that provide the result. A neural network is not programmed to execute a given activity, but is trained using an automatic learning algorithm, by means of a series of examples of the reality to be modelled.

The MLP or Multi-Layer Perceptron model currently covers a good percentage of neural network applications to speech. The MLP model neurone sums the input weighting it with the intensity of the connections, passes this value to a non-linear function (logistic) and delivers the output. The neurones are organised in levels: an input level, one or more internal levels and an output level. The connection between neurones of different levels is usually complete, whereas neurones of the same level are not interconnected.

With specific regard to speech recognition neural networks, one recognition model in current use is illustrated in document EP 0 623 914. This document substantially describes a neural network incorporated in an automaton model of the patterns to be recognised. Each class is described in terms of left-right automatons with cycles on states, and the classes may be whole words, phonemes or other acoustic units. A Multi-Layer Perceptron neural network computes automaton state emission probability.

It is known however that neural network execution is very heavy in terms of the required computing power. In particular, a neural network utilises a speech recognition system like the one described in the aforementioned document has efficiency problems in its sequential execution on a digital computer due to the high number of connections to compute (for each one there is an input product for the weight of the connection), which can be estimated as around 5 million products and accumulations for each second of speech.

An attempt at solving this problem, at least in part, was made in document EP 0 733 982, which illustrates a method for accelerating neural network execution, for processing correlated signals. This method is based on the principle that, since the input signal is sequential and evolves slowly over time in a continuous manner, it is not necessary to re-compute all the activation values of all the neurones for each input, but it suffices to propagate the differences with respect to the previous input in the network. In other words, the operation is not based on absolute values of neurone activation at time t, but on the difference with respect to the activation at time t-1. Therefore at each point of the network, if a neurone has, at time t, activation sufficiently similar to that of time t-1, it does not propagate any signal forward, limiting the activity exclusively to those neurones with an appreciable change in activation level.

However, the problem remains, especially in the case of small vocabularies that use only a small number of phonetic units. Indeed, in known systems each execution of the neural network envisages computing of all output units, with an evident computation load for the system.

SUMMARY OF THE INVENTION

This invention proposes to solve the problem of how to speed up neural network execution, in particular in cases in which activation of all the output units is not necessary, leaving the functional characteristics of the overall system in which the neural network is used unchanged.

This and other purposes are achieved by the method and device for accelerating neural network execution as claimed in the claims section.

The advantage of the invention is that it does not compute all the neural network unit output activations exhaustively, but in a targeted manner instead according to the real needs of the decoding algorithm.

In this way not all the neural network output units are necessary, allowing for reduced mode network processing, reducing the processing load on the overall system.

BRIEF DESCRIPTION OF DRAWINGS

These and other features of the invention are clarified in the following description of a preferred form of embodiment, given by way of example and by no means limiting, and in the annexed drawings in which.

DETAILED DESCRIPTION OF THE PREFERRED EMBODIMENTS

Figure 1:
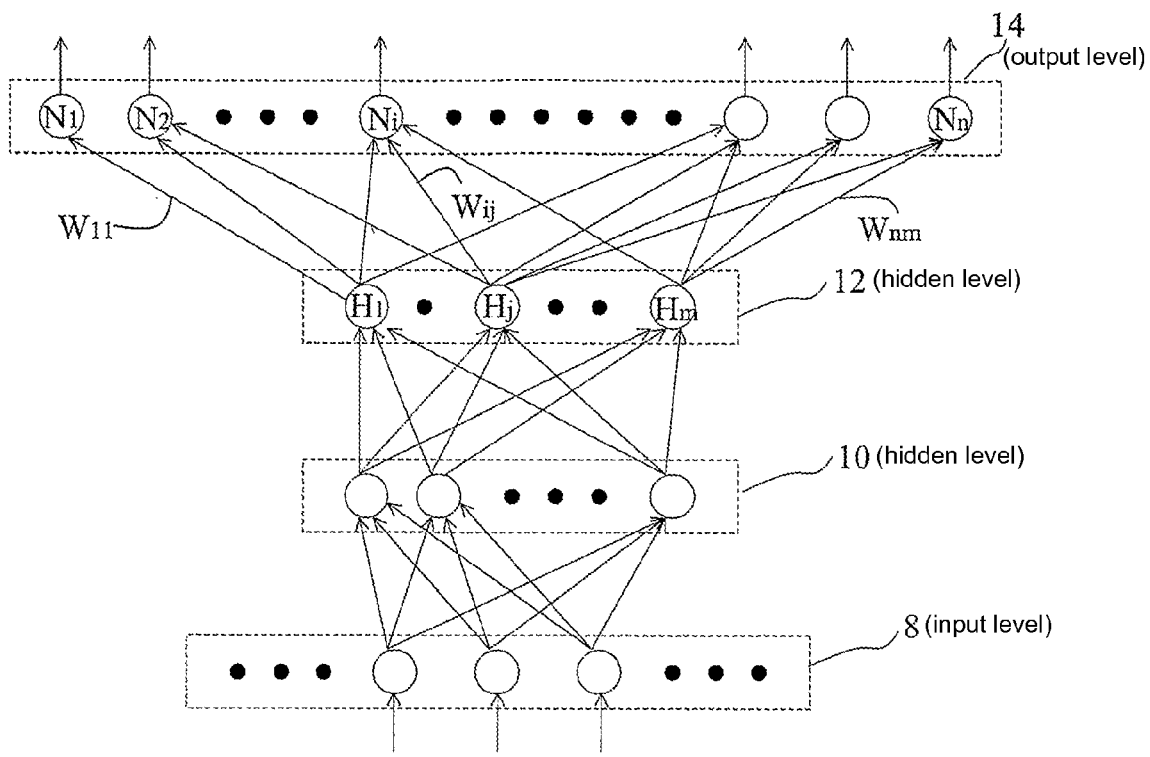
FIG. 1 is a schematic representation of an MLP or Multi-Layer Perceptron type neural network.

In reference to FIG. 1, an MLP or Multi-Layer Perception type neural network includes a generally very high number of computing units or neurones, organised in levels. These levels comprise an input level 8, an output level 14 and two intermediate levels, generally defined as hidden levels 10 and 12. Neurones of adjacent levels are connected together by weighted connections, for example the connection $W_{ij}$ that unites neurone $H_j$ of hidden level 12 with neurone $N_i$ of output level 14, and each connection envisages computing of the neurone input value for the weight associated with the same connection. The great number of connections to compute, which can be estimated as around 5 million products and accumulations for each second of speech, highlights an efficiency problem in the sequential execution of the neural network on a digital computer.

For applications in the field of speech recognition, in terms of computing units or neurones, a neural network of the type illustrated in FIG. 1 may have the following structure:

| Input level: | 273 units (neurones) |
|---|---|
| First hidden level: | 315 units |
| Second hidden level: | 300 units |
| Output level: | 686 units |

(Total units: 1,574)

and the following values in terms of the number of weighted connections:
between input level and first hidden level:
  7,665 connections
between first hidden level and second hidden level:
  94,500 connections
between second hidden level and output level:
  205,800 connections (Total connections: 307,965)

It is evident that about ⅔ of the connections are located between the second hidden level and the output level. In effect, this is the connection level that has the greatest influence on the total computing power required by the overall system.

The proposed solution envisages not computing all the neural network output unit activations exhaustively, but in a targeted way according to the real needs of the decoding algorithm used, as will be explained in more detail later on.

Effectively, in many cases, at least in the field of speech recognition, it would suffice to compute only a subset of output units instead of the totality of output units as is commonly the case in traditional type systems.

Figure 2:
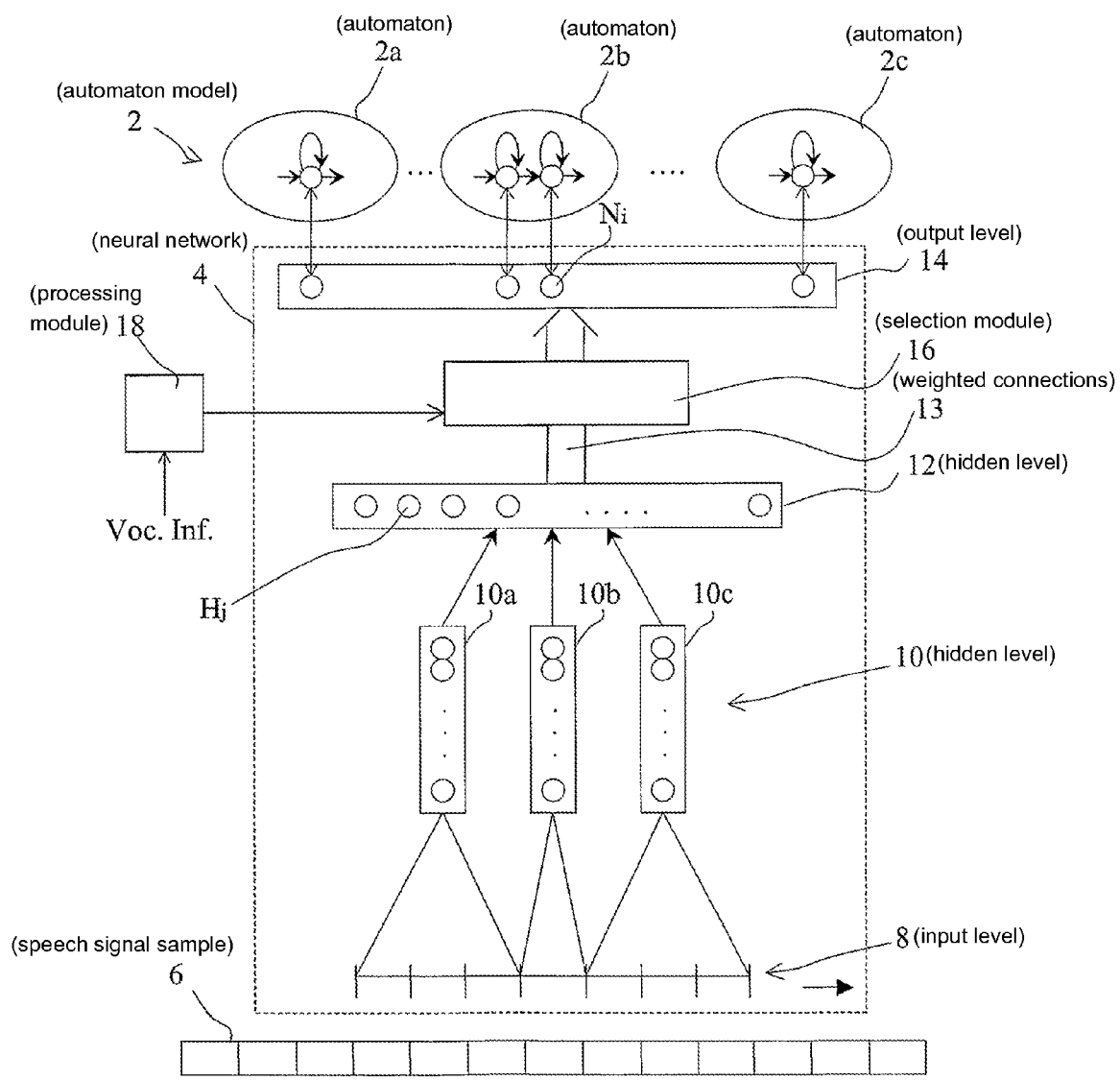
FIG. 2 is a schematic illustration of a speech recognition device, incorporating a neural network produced according to this invention.

To better understand the basic principle of this method and the related device, let us now analyse a model of a recognition system produced according to this invention, with reference to FIG. 2.

The recognition model represented in FIG. 2 substantially comprises a neural network 4 incorporated in an automation model 2 of the patterns to recognise. Each class is described in terms of left-right automaton 2a, 2b, 2c (with cycles on states), and the classes can be whole words, phonemes or acoustic units. A Multi-Layer Perceptron neural network 4 computes automaton state emission probability.

The input window, or input level 8, is 7 frames wide (each 10 ms long), and each frame contains 39 parameters (Energy, 12 Cepstral Coefficients and their primary and secondary derivatives). The total number of computing units or neurones in the input layer is indeed equal to 7×39=273. The input window "runs" on a sequence of speech signal samples 6, sampled on input from the preceding modules (signal processing, etc.).

The first hidden level 10 is divided into three feature extraction blocks, the first block 10b for the central frame, and the other two 10a and 10c for the left and right contexts. Each block is in turn divided into sub-blocks dedicated to considering the various types of parameter (E, Cep, ΔE, ΔCep).

The second hidden level 12 transforms the space between the features extracted from the first hidden level 10 and a set of self-organised features (for example silence, stationary sounds, transitions, specific phonemes).

The output level 14 integrates this information estimating the probability of emission of the states of the words or acoustic-phonetic units used. The output is virtually divided into various parts, each corresponding to an automaton 2a, 2b, 2c, which in turn corresponds to an acoustic-phonetic class. The acoustic-phonetic classes used are so-called "stationary-transition" units, which consist of all the stationary parts of the phonemes plus all the admissible transitions between the phonemes themselves. The stationary units 2a, 2c are modelled with one state, and each correspond to a network output unit, whereas the transition units are modelled with two states, for example unit 2b in FIG. 2, and correspond to two network output units.

The advantage of the invention is that the weighted connections 13, which connect the second hidden level 12 computing units with those of the output level 14, can be redefined on each occasion, working through a specific selection module 16 that permits selection of those connections thereby reducing their number. In practical terms the module 16 permits elimination of all connections afferent to output units not used at a given moment, thereby reducing the overall computing power necessary for network execution.

The selection module 16 is in turn controlled by a processing module 18 which, receiving speech information (Voc. Inf) input from the recognition system related to subsets of words that in that given moment the system has to recognise, translates that information into specific commands for the selection module 16, according to the method described.

According to the invention, it is possible to apply the method when the words to be recognised are contained in a subset of the general vocabulary of words that the speech recognition system is capable of recognising. The smaller the subset of words used, the greater the advantages will be in terms of reducing the required computing power. In effect, when using speech recognition on small vocabularies, for example the 10 numbers, the active vocabulary does not contain all the phonemes; thus not all the outputs of the network are necessary for their decoding and recognition.

The method for accelerating execution of the neural network 4 envisages the execution of the following steps in the order given:

determining a subset of acoustic-phonetic units necessary for recognising all the words contained in the word subset of the general vocabulary;

eliminating from the neural network 4, by means of the selection module 16, all the weighted connections ($W_{ij}$) afferent to computing units ($N_j$) of hidden level 14 corresponding to acoustic-phonetic units not contained in the previously determined subset of acoustic-phonetic units, thereby obtaining a compacted neural network 4', optimised for recognition of the words contained in that vocabulary subset;

exclusively executing, at each instant in time, the compacted neural network (4').

Figure 3:
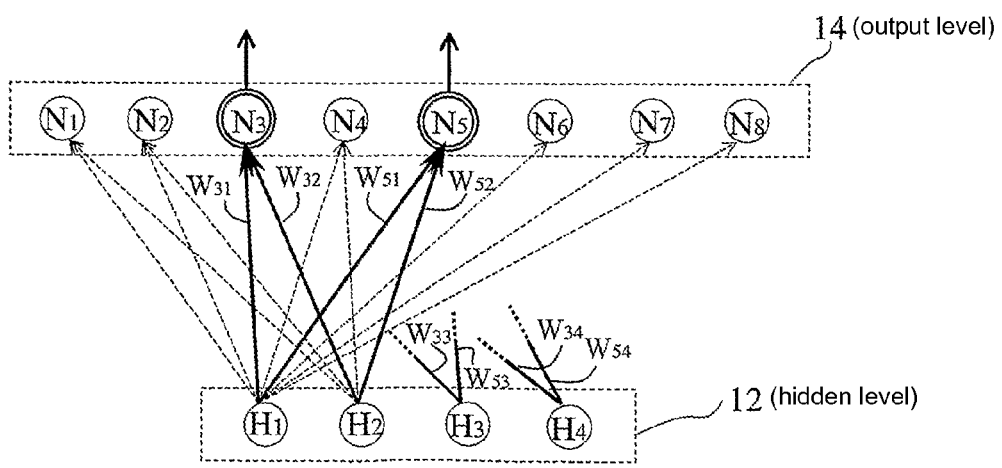
FIG. 3 is a schematic illustration of an application of the method described in the invention.

The unnecessary connection elimination phase is schematically represented in FIG. 3, which shows a highly simplified example of a neural network with just four neurones $H_1 \ldots H_4$ in hidden level 12 and eight neurones $N_1 \ldots N_8$ in the output level 14. In a traditional type neural network each neurone in hidden level 12 is connected to all the neurones in the output level (14), and at each execution of the neural network, computes all the corresponding connections ($W_{ij}$).

Supposing in this case that the vocabulary subset only requires the presence of the acoustic-phonetic units corresponding to output neurones $N_3$ and $N_5$, highlighted in FIG. 3, the method described in the invention permits temporary elimination of all the weighted connections afferent to unused acoustic-phonetic units, and the reduction of neural network execution to a limited number of connections (connections $W_{31}, W_{32}, W_{51}, W_{52}, W_{33}, W_{53}, W_{34}, W_{54}$ highlighted in FIG. 3).

With regard to the choice of the acoustic-phonetic unit subset, it generally suffices to include only the stationary units and the transition units of the phonemes that make up the words in the subset of the general vocabulary.

However, since there are a lot fewer stationary units than transition units, for example in the Italian language there are 27 to 391, it is preferable to leave all the stationary units in any case and eliminate all the transition units not present in the active vocabulary.

Moreover, since stationary units 2a and 2c are modelled with a single state, and correspond to a single network output unit, whereas the transition units are modelled with two states (and two network output units), the reduction in terms of network output units is in all cases very high.

The general vocabulary subset used in a given moment by the speech recognition system can be the union of several subsets of active vocabularies. For example, in the case of an automatic speech recognition system for telephony applications, a first word subset could consist simply of the words "yes" and "no", whereas a second subset could consist of the ten numbers from zero to nine, while the subset used at a given moment could be the union of both subsets. The choice of a vocabulary subset obviously depends on the complex of words that the system, at each moment, should be able to recognise.

Referring to the previously described neural network structure, with 1,574 computing units or neurones and 307,965 weighted connections and considering a subset containing the ten numbers (0 to 9), applying the method described in the invention would reduce the weighted output connections to 26,100, and the total weighted connections to 128,265 (42% of the initial number). This would in theory save 58% of the required computing power.

In the case of the ten numbers, the selected acoustic-phonetic units would be 27 stationary plus 36 transition (of which 24 with 2 states), that is to say, just 87 states out of the 683 total.

Although this example refers to the Italian language, it does not depend on language and the method is indeed entirely general.

In terms of the algorithm for implementing the method in a recognition system, the method is structured into the following steps:

1) at the recognition initialisation phase computing the union of active vocabularies required for recognition;

2) re-compacting the last level of the neural network always leaving all the stationary units and only the transition units contained in the active vocabulary;

3) executing only the re-compacted network at each instant in time.

The experimental results obtained by implementing the illustrated method in a speech recognition system, with the task of recognizing the ten numbers, gave an average reduction of 41% in required computing power. Vice-versa, as expected, there was no appreciable difference on large scale vocabularies (2000 words).

The invention claimed is:

1. A method for accelerating neural network execution in a speech-recognition system, for recognizing words contained in a subset of a general vocabulary of words that the same system is capable of recognizing, said neural network comprising a number of computing units organized in levels including at least one hidden level and one output level, the computing units of said hidden level being connected to the computing units of said output level via weighted connections, said computing units of said output level corresponding to acoustic-phonetic units of said general vocabulary, said acoustic-phonetic units comprising stationary units and transition units, the method comprising the following steps:

determining a subset of the acoustic-phonetic units to always include all of said stationary units and only include those of said transition units that are necessary for recognizing all the words contained in said general vocabulary subset;

eliminating from the neural network all the weighted connections afferent to computing units of said output level that correspond to acoustic-phonetic units not contained in said previously determined subset of said acoustic-phonetic units, thus obtaining a compacted neural network; and executing, at each moment in time, only said compacted neural network.

2. The method according to claim 1 further comprising determining the transition units present in said general vocabulary subset.

3. The method according to claim 2 wherein said general vocabulary subset is the union of several subsets of vocabularies active at any given moment.

4. A method comprising:

determining, from a set of acoustic-phonetic units connected to the output of a neural network and configured to model a set of sounds, a subset of the set of acoustic-phonetic units configured to model a subset of the set of sounds, wherein the neural network comprises at least one output neuron connected to each acoustic-phonetic unit of the set, each output neuron receives a plurality of weighted inputs, the set of acoustic-phonetic units includes stationary units and transition units, and the subset always includes all of the stationary units and only those of the transition units necessary for recognizing all the words contained in the subset;

executing the neural network such that only the weighted inputs that are connected to the output neurons that are connected to acoustic-phonetic units in the subset are computed.

5. The method of claim 4, wherein the executing the neural network further comprises computing only the output neurons that are connected to acoustic-phonetic units in the subset.

6. The method of claim 4, wherein the executing occurs in a speech recognition application.

* * * * *